United States Patent [19]

Reddy

[11] Patent Number: 4,975,627
[45] Date of Patent: Dec. 4, 1990

[54] BRAKE SEQUENCED ELEVATOR MOTOR SPEED CONTROL

[75] Inventor: Narasimha K. Reddy, Bolton, Conn.

[73] Assignee: Otis Elevator Company, Farmington, Conn.

[21] Appl. No.: 232,417

[22] Filed: Aug. 15, 1988

[51] Int. Cl.[5] ................................ H02P 3/00
[52] U.S. Cl. .................... 318/372; 318/365; 187/108
[58] Field of Search .............. 318/362, 364, 365, 371, 318/373, 261, 372, 374, 273, 275, 370; 187/109, 32, 73, 112, 108

[56] References Cited

U.S. PATENT DOCUMENTS

| | | | |
|---|---|---|---|
| 1,066,742 | 7/1913 | Lutz | 318/364 |
| 1,931,564 | 10/1933 | White et al. | 318/365 |
| 2,385,671 | 9/1945 | Whiting | 318/364 |
| 2,503,438 | 4/1950 | Gruner | 318/364 |
| 2,600,568 | 6/1952 | Nelson | 318/364 |
| 3,136,938 | 6/1964 | Grepe | 318/366 X |
| 4,139,810 | 2/1979 | Ueki et al. | 318/364 X |

Primary Examiner—William M. Shoop, Jr.
Assistant Examiner—A. Jonathan Wysocki
Attorney, Agent, or Firm—Francis J. Maguire, Jr.

[57] ABSTRACT

In an elevator, an electric motor is connected to a brake through a gearbox. The brake is controlled with an electromagnet. A torque signal is applied to the motor. Brake voltage characteristics are used to detect actual brake engagement and to signal a switch to substitute a decaying torque control signal to the motor for the motor torque signal supplied to the motor while the elevator is moving. Motor torque is thereby gradually rather than suddenly reduced to zero.

5 Claims, 2 Drawing Sheets

BRAKE SEQUENCED ELEVATOR MOTOR SPEED CONTROL

TECHNICAL FIELD

This invention relates to geared elevators.

BACKGROUND ART

Following conventional practice in traction elevators, an elevator car approaching a floor for a "stop," the drive motor is slowed, the brake is dropped and, then the motor is stopped.

Motor torque should drop to zero simultaneously with brake engagement (dropping). Control inaccuracies and circuit characteristics may cause excessive residual torque when the brake engages. In some types of geared elevators, in which actual motor speed is fed back and summed with a dictated motor speed to produce an error signal used to provide a motor torque or speed signal, gear noise (chattering) is produced if the brake is engaged and motor torque is increased (by the sudden increase in the difference between actual motor speed, now zero, and the dictated motor speed, which has not changed) The gear noise or impact noise is of two forms. First, a chatter is caused by the difference between the actual motor speed and the dictated motor speed and thus the increase in motor torque; the chatter is caused because motor torque is increasing although the brake has already has applied. A second form of gear noise, a "thud", follows the chatter. Rather than being caused by increasing motor torque after the brake has been applied, a thud is caused by the torque current dropping instantaneously to zero such that the gear travels through a backlash.

DISCLOSURE OF THE INVENTION

An object of the invention is to minimize motor torque at the time the brake engages.

According to the invention, brake engagement is used to trigger a smooth reduction in the motor torque command signal over a short time.

According to the invention, actual brake engagement is detected electrically from brake current characteristics. Commencing at the moment engagement is detected, a signal applied to motor causing motor torque is gradually reduced to zero.

According to the invention, motor torque command signal reduction and brake engagement sensing are implemented with "supplementary circuitry," components added to an existing motor and brake control.

BEST MODE FOR CARRYING OUT THE INVENTION

Figure 1:
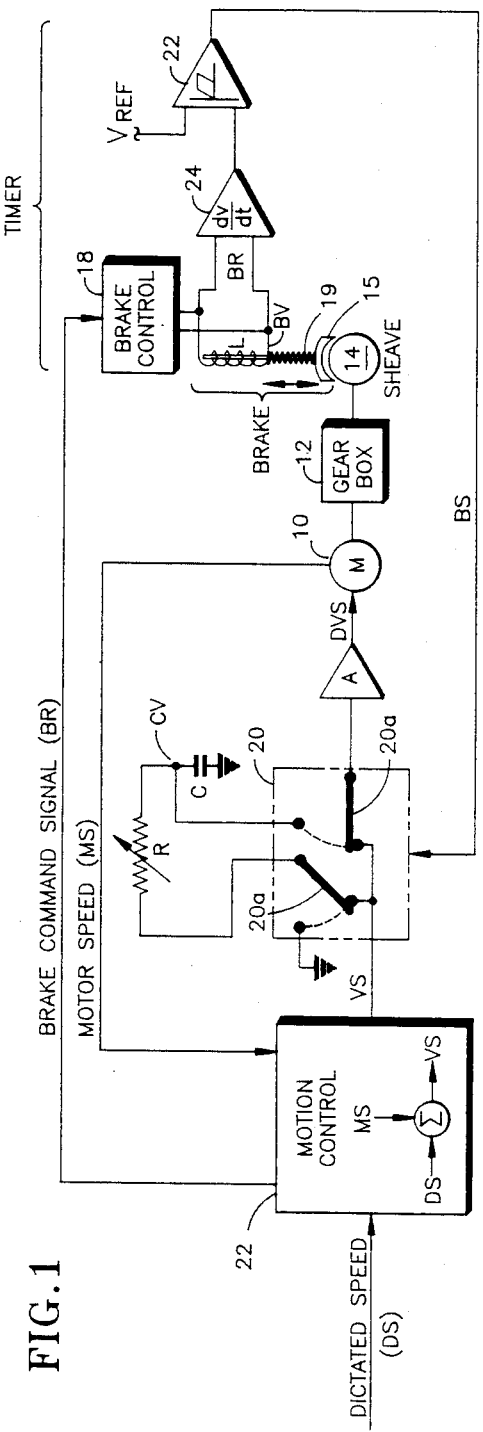
FIG. 1 is a functional block diagram of an elevator drive having a motor and an electromagnetic brake mechanically connected through a gearbox.

A motor 10, in FIG. 1, is connected, e.g. through a gearbox 12, to a sheave 14, which is engaged by a brake shoe 15 when the motor is stopped. (In a typical traction elevator, the sheave would connect the motor to an elevator car through a "rope" (cable) which, for clarity, is not shown.)

A coil L receives current (the brake (BR) signal) from a brake control 18. The current from the BR signal pulls the shoe away from the sheave, acting against a spring 19 that pushes the brake shoe against the sheave.

Motor torque is a function of the magnitude of the motor torque signal or dictated velocity signal (DVS) supplied from a buffer A which is connected to a switch 20. In the typical elevator, the DVS signal controls motor torque (hence speed) to reduce the error between a dictated motor speed DS (car speed) and the actual motor MS (car speed) -- this being typical in a "close-loop speed control. The switch 20 receives a velocity signal (VS) from a motion control 22, which reverses the DS and MS signals to produce the VS signal based on the difference between the two (the error). The switch, when in a first condition (the state shown) applies through the contacts 20a VS through an integrator comprising resistor R and capacitor C. In this state, it also applies VS to buffer A. The voltage across capacitor C follows VS. In a second state, however, the capacitor voltage CV is applied, through the new connections of contacts 20a to buffer A and, through resistor R, to ground, allowing the capacitor voltage to decay to zero at the time constant determined by the values of R and C. This second state arises when a brake engagement signal (BS) is applied to the switch. The brake command signal (BR) may be applied from a timing circuit (timer in FIG. 1) that produces the BS signal following an elapsed time interval after the BR signal is produced. Such a timing circuit may consist of a monostable or a differentiation based subcircuit 24

With the differentiation based subcircuit, the BS signal is produced by a comparator 22 when the derivative of a signal BV, sensed by a differentiator 24, exceeds a reference, VREF. As explained presently, the polarity of VREF is the polarity of the derivative of the voltage change at X (FIG. 2) created by the inductive change in coil L when the brake shoe engages the sheave and BV discharges through coil L. This takes place as the brake current (brake-voltage BV in FIG. 2) decays after the brake signal BR is removed by the brake control. However, differentiator 24, as shown, responds to the voltage of coil L, specifically a sharp position spike at X is produced by the inductive change of L when the shoe 15 engages the sheave.

Figure 2:
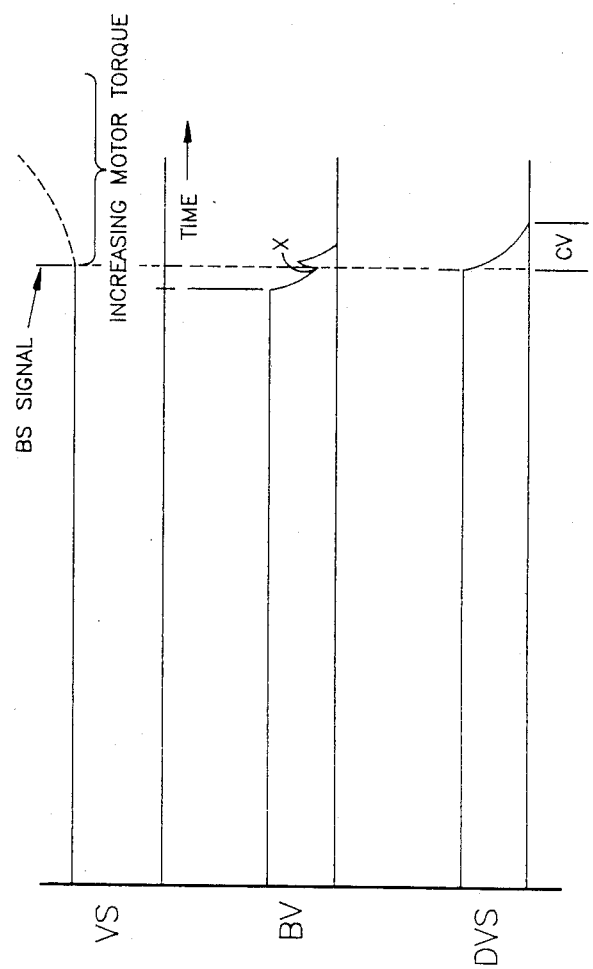
FIG. 2 comprises three waveforms on a common time line, the first showing a velocity signal (VS) from a motion control, the second showing brake magnetic coil voltage (BV), the third showing a motor torque signal dictated velocity signal (DVS) which is applied, according to the invention, to the motor in relation to the coil voltage in the manner of the invention.

FIG. 2 also shows THAT signal DVS decays slowly to zero after THE brake engages (at X), even though it SUBSEQUENTLY INCREASES-DUE TO THE RAPID DROP IN MOTOR SPEED WHEN THE BRAKE DROPS. The resistor is adjustable so that the decay rate can be lengthened or shortened to minimize gear noise after brake engagement—so that motor torque decreases smoothly after brake engagement were VS to be applied after engagement (the prior art), it can be seen that motor torque would be substantial after the brake engages the sheave, creating gear noise.

As set forth previously, the instant that there is brake shoe engagement can be sensed by the subcircuit in FIG. 2, or "it can be synthesized," in effect, with a timer by setting the timer interval to equal the estimated or measured time between removal of the BR signal and brake engagement. It should be appreciated that the invention may also sense brake shoe engagement using a mechanical switch, attached to the brake shoe, to provide the BS signal when the brake shoe moves enough to contact the sheave 14.

The invention, therefore, synchronizes a progressive decay in motor torque from the time brake engagement actually occurs, and this is done without mechanically sensing brake shoe movement, increasing accuracy and reliability. The invention, it should be appreciated, may be implemented by adding the differentiator, comparator, switch and the resister and capacitor to an existing system as shown, this avoiding a need to modify the controller.

The embodiment described herein may be modified in whole or in part without departing from the true scope and spirit of the invention.

I claim:

1. An elevator drive comprising a motion control for providing a torque signal to a motor for controlling torque and for providing a brake release signal to an electromagnetic brake for causing brake disengagement from a connecting means connected to the motor, characterized by:

timer means, responsive to the removal of said brake release signal, for providing a brake engagement signal at a selected time after the removal of said brake release signal; and torque means, responsive to said brake engagement signal, for causing said torque signal to be removed from said motor and for causing a decaying torque signal to be substituted therefor.

2. An elevator drive according to claim 1, characterized by said timer means comprising a differentiator across the electromagnetic coil terminals for producing a differentiator output signal and a comparator for producing the brake engagement signal when the voltage of said differentiator output signal is greater than a threshold voltage with a polarity corresponding to the polarity of a voltage change across the coil terminals produced by the inductive change in the coil when said brake engages said connecting means.

3. An elevator drive according to claims 1 or 2, characterized by said torque means comprising a switch and a resistor and capacitor, said motion control control providing a torque signal through said switch to the motor and through said resistor to said capacitor when the switch is in a first state, said switch, when in a second state, applying the capacitor voltage to the motor removing the torque signal from the motor and resistor, and connecting the resistor to provide circuit connection between the capacitor terminals said second state arising in response to said brake engagement signal.

4. A method of modifying an elevator drive in which motor input terminals are connected to the output terminals of a motion control and a brake coil is connected to additional output terminals on the motion control to receive a brake release command, causing the brake to be disengaged from the motor, comprising the steps:

breaking the connection between the motor input terminals and the motion control output terminals;

installing a switching circuit between the motor input terminals and the motion control output terminals, said switching circuit, when in a first state, connecting the motion control output terminals to the motor input and charging circuit that charges to the voltage level of the motion control output terminals, and when in a second state, disconnects the motion control output terminal from the motor input terminals and connects the charging circuit to the motor input terminals in such a way that the voltage of the charging circuit decays to zero over time and is applied to the motor input terminal, said switch being activated into said second state in response to a switch control signal connecting a timer to one of the brake coil terminals which will produce said switch control signal at a selected time after said brake release command is removed.

5. A method according to claim 4, characterized in that said step of connecting a timer comprises connecting a voltage differentiation and comparison circuit to the brake coil terminals to produce said switch control signal in response to a brake coil voltage reversal as brake coil current decays following removal of a brake deactivation current from the brake coil.

* * * * *